United States Patent
Jones (10) Patent No.: US 11,687,717 B2
(45) Date of Patent: Jun. 27, 2023

(54) SYSTEM AND METHOD FOR MONITORING AND ROUTING OF COMPUTER TRAFFIC FOR CYBER THREAT RISK EMBEDDED IN ELECTRONIC DOCUMENTS

(71) Applicant: Morgan State University, Baltimore, MD (US)

(72) Inventor: Garfield Jones, Germantown, MD (US)

(73) Assignee: MORGAN STATE UNIVERSITY, Baltimore, MD (US)

(*) Notice: Subject to any disclaimer, the term of this patent is extended or adjusted under 35 U.S.C. 154(b) by 254 days.

(21) Appl. No.: 17/110,662

(22) Filed: Dec. 3, 2020

(65) Prior Publication Data
US 2021/0165964 A1 Jun. 3, 2021

Related U.S. Application Data

(60) Provisional application No. 62/942,823, filed on Dec. 3, 2019.

(51) Int. Cl.
*G06F 40/289* (2020.01)
*G06F 40/30* (2020.01)
(Continued)

(52) U.S. Cl.
CPC ........ *G06F 40/289* (2020.01); *G06F 16/3344* (2019.01); *G06F 16/35* (2019.01);
(Continued)

(58) Field of Classification Search
CPC .... G06F 16/3344; G06F 16/35; G06F 16/953; G06F 40/289; G06F 40/30; G06N 3/0472; G06N 3/047; H04L 51/08; H04L 63/1433
See application file for complete search history.

(56) References Cited

U.S. PATENT DOCUMENTS

| | | | | |
|---|---|---|---|---|
| 5,832,470 | A | * 11/1998 | Morita | G06F 16/355 |
| 6,826,724 | B1 | * 11/2004 | Shimada | G06F 16/313 |
| | | | | 707/E17.084 |

(Continued)

OTHER PUBLICATIONS

O. Mendsaikhan, H. Hasegawa, Y. Yamaguchi and H. Shimada, "Identification of Cybersecurity Specific Content Using the Doc2Vec Language Model,", 2019, 2019 IEEE 43rd Annual Computer Software and Applications Conference (COMPSAC), pp. 396-401 (Year: 2019).*

(Continued)

*Primary Examiner* — Eric Yen
(74) *Attorney, Agent, or Firm* — Gregory M. Stone; Whiteford, Taylor & Preston (57) ABSTRACT

Disclosed herein are computer-implement systems and methods for determining whether an electronic document transiting a computer network is safe for viewing and does not contain malicious code, and automatically routing or deleting such electronic document based on such determination, thus providing quick risk decisions relating to the electronic document using an objective, quantitative method. A search algorithm is employed to detect the presence of words or phrases in the subject electronic document that are possible threats to the computer network. Threat updates may be provided through publicly available threat database. A weight is added to the generated score that accounts for the time that the particular vulnerability has been in the subject threat database. Finally, a PNN is used to quickly and objectively classify the subject electronic document for acceptance, quarantine, or denial.

20 Claims, 5 Drawing Sheets

(51) Int. Cl.
*G06F 16/33* (2019.01)
*H04L 51/08* (2022.01)
*G06F 16/953* (2019.01)
*H04L 9/40* (2022.01)
*G06F 16/35* (2019.01)
*G06N 3/047* (2023.01)

(52) U.S. Cl.
CPC ............ *G06F 16/953* (2019.01); *G06F 40/30* (2020.01); *G06N 3/047* (2023.01); *H04L 51/08* (2013.01); *H04L 63/1433* (2013.01)

(56) References Cited

U.S. PATENT DOCUMENTS

| | | | | |
|---|---|---|---|---|
| 7,519,565 | B2 * | 4/2009 | Prakash | H04L 51/212 706/20 |
| 7,756,535 | B1 * | 7/2010 | Diao | H04L 51/212 709/206 |
| 9,361,377 | B1 * | 6/2016 | Azari | G06F 16/335 |
| 10,454,955 | B2 | 10/2019 | Schulman et al. | |
| 2003/0217066 | A1 * | 11/2003 | Kayahara | G06F 16/334 |
| 2003/0225755 | A1 * | 12/2003 | Iwayama | G06F 16/355 |
| 2013/0247187 | A1 * | 9/2013 | Hsiao | G06F 21/566 726/22 |
| 2018/0357531 | A1 * | 12/2018 | Giridhari | G06N 3/0472 |
| 2019/0197240 | A1 * | 6/2019 | Pradhan | G06F 21/565 |
| 2020/0364349 | A1 * | 11/2020 | Nunes | G06F 16/951 |
| 2021/0216928 | A1 * | 7/2021 | O'Toole | G06F 16/287 |

OTHER PUBLICATIONS

Lee, L. H., Rajkumar, R., & Isa, D. "Automatic folder allocation system using bayesian-support vector machines hybrid classification approach", 2012, Applied Intelligence, 36(2), 295-307. (Year: 2012).*

Uysal, Alper Kursat and Serkan Gunal. "A Novel Probabilistic Feature Selection Method for Text Classification." Knowledge-Based Systems. vol. 36. Dec. 2012. pp. 226-235.

Mulwad, Varish, et al. "Extracting Information about Security Vulnerabilities from Web Text." Proceeding of the Web Intelligence for Information Security Workshop. Aug. 2011. Lyon, France.

Ning, Liu. "Network Intrusion Classification Based on Probabilist Neural Network." 2013 International Conference on Computational and Information Sciences. pp. 57-59.

* cited by examiner

SYSTEM AND METHOD FOR MONITORING AND ROUTING OF COMPUTER TRAFFIC FOR CYBER THREAT RISK EMBEDDED IN ELECTRONIC DOCUMENTS

CROSS REFERENCE TO RELATED APPLICATIONS

This application is based upon and claims the benefit of U.S. Provisional Application No. 62/942,823 titled "Automated Calculation of a Risk Decision for a Textual Document Using a Probabilistic Neural Network," filed with the United States Patent & Trademark Office on Dec. 3, 2019, the specification of which is incorporated herein by reference in its entirety.

FIELD OF THE INVENTION

This invention relates generally to computer-implemented analysis of computer networks for purposes of cyber risk evaluation and routing of network traffic in response to such evaluation, and more particularly to computer-implement systems and methods for determining whether an electronic document transiting a computer network is safe for viewing and does not contain malicious code, and automatically routing or deleting such electronic document based on such determination.

BACKGROUND OF THE INVENTION

The numbers of cyber-attacks on networks are growing in number, and becoming more sophisticated, aggressive and dynamic in execution. The increasing numbers of devices on interconnected computer networks have spawned an even more complex number of software applications on those networks. Measuring the risk of an intrusion or a compromise and identifying the most recent tactics of cyber criminals on large computer networks can be difficult. In fact, organizations have been struggling to make objective risk decisions concerning security of computer networks against cyber-attacks since the dawn of the Internet. Primarily, such difficulties arise due to the wide range of services and applications running within the network, the multiple vulnerabilities associated with each application, the severity associated with each vulnerability, and the ever-changing attack vector of cyber criminals. Likewise, software vulnerabilities are high priorities within any information technology ("IT") system. Like hardware, software can also pose a significant risk to IT systems and networks.

To assist in combating these increasing cyber threats within networks, organizations have focused on identifying cyber risks and threats on the network. Such risk-based decisions are often made at the strategic level, where senior decision makers weigh subjective expert information in order to determine cyber risk. The acceptance of a document by a system administrator is such a risk-based decision. Risk may be defined as the net negative impact of the exercise of a vulnerability, considering both the probability and the impact of occurrence. Essentially, risk is a product of threat likelihood value multiplied by impact. Quantitatively, risk is difficult to assess, such that a subjective element is generally part of the score.

The Common Vulnerability Scoring System ("CVSS") is a risk scoring mechanism by which cyber risk may be evaluated, and more particularly may quantify the severity of a particular security vulnerability. Likewise, the National Vulnerability Database ("NVD") is the U.S. government repository of standards-based vulnerability management data represented using the Security Content Automation Protocol ("SCAP"). This data enables automation of vulnerability management, security measurement, and compliance. The NVD includes databases of security checklist references, security-related software flaws, misconfigurations, product names, and impact metrics.

The CVSS contains base, temporal, and environmental scoring approaches. The CVSS helps organizations prioritize and coordinate a joint response to security vulnerabilities by communicating the base, temporal, and environmental properties of a vulnerability. The base, temporal, and environmental metrics are thus the three measures that quantify the severity of vulnerabilities using the CVSS. The base metric assumes the fundamental characteristics of vulnerability are constant over time and user environments. The temporal metric represents the characteristics of vulnerability that change over time but not among use environments. Likewise, the environmental metric represents the characteristics of vulnerability that are relevant and unique to a particular user's environment. Further, each of those metrics are composed of a number of elements. More particularly, the base metric is composed of the elements: (i) access vector; (ii) access complexity; (iii) authentication; (iv) confidentiality impact; (v) integrity impact; and (vi) availability impact. Likewise, the temporal metric is composed of the elements: (i) exploitability; (ii) remediation level; and (iii) report confidence. Finally, the environmental metric is composed of the elements: (i) collateral damage potential; (ii) target distribution; (iii) confidentiality requirement; (iv) integrity requirement; and (v) availability requirement.

The CVSS may thus provide a way to capture certain features of a vulnerability, resulting in a numerical score equating to a severity, as well as a textual representation of the score. However, although CVSS may produce a quantitative score reflecting risk, the score is largely generated by subjective means and does not allow for a quick, objective determination by system administrators of whether a textual document that is transiting the network (e.g., a textual document, such as a PDF file, attached to an email message or the like) is a threat, such as by containing malicious code that may be downloaded to a user's computer upon opening such document. While an objective risk evaluation process at a tactical level could assist the senior decision makers with a more quantitative portion of their risk decision process, few commercially viable tools are available that provide such assistance.

Further, a Probabilistic Neural Network ("PNN") is a classifier algorithm and can be used as an approximator mapping any input pattern to a number of classifications. By replacing the sigmoid activation function often used in neural networks with an exponential function, a PNN may be formed that can compute nonlinear decision boundaries that approach the Bayes optimal. The PNN is an implementation of a statistical algorithm called kernel discriminant analysis in which the operations are organized into a multilayered feed-forward network with four layers, including: (i) input layer; (ii) pattern layer; (iii) summation layer; and (iv) output layer. The input layer supplies the extracted features from the dataset. In the pattern layer, the total number of neurons is equal to the sum of the numbers of neurons used to represent the patterns for each class. Each class can contain a large number of training patterns (training vectors) of which dimension is the same as the number of input factors, while it is taking a set of specific values of input factors.

While PNNs could potentially be used to improve upon prior methods of evaluating risk of cyber infiltration, to Applicant's knowledge no such commercially viable tools currently exist, particularly for the automated risk decision of whether a textual file that is transiting a computer network should be accepted, quarantined, or deleted based on a determination of a level of cyber risk associated with that textual file.

Therefore, there remains a need in the art for computer-implemented systems and methods configured to provide quick risk decisions on whether a textual file that is transiting a computer network should be accepted or not based on a quantitative method.

SUMMARY OF THE INVENTION

Disclosed herein are computer-implement systems and methods for determining whether an electronic document transiting a computer network is safe for viewing and does not contain malicious code, and automatically routing or deleting such electronic document based on such determination, thus providing quick risk decisions relating to the electronic document using an objective, quantitative method. In accordance with certain aspects of an embodiment of the invention, a search algorithm is employed to detect the presence of words or phrases in the subject electronic document that are possible threats to the computer network. Threat updates may be provided through the publicly available Common Vulnerabilities and Exposures (CVE) system or other publicly available threat database. A weight is added to the generated score that accounts for the time that the particular vulnerability has been in the subject threat database. Finally, a PNN is used to quickly and objectively classify the subject electronic document for acceptance, quarantine, or denial.

The PNN, in accordance with certain aspects of the invention, may provide prompt classification of a textual document for whether or not such textual document comprises a cyber threat. The hidden or simulation layer of the PNN is where the total "n" artificial neurons take in a set of weighted inputs and produce an output through an activation function. Parameters differ when a sample population is known versus unknown. The estimator employed by systems and methods according to the invention may assess that the sample population of the textual document is known. The pattern layer of the PNN (sometimes referred to as the summation layer) is the layer in which all neurons are totaled. The final layer is the output layer, which decides in which class a subject test sample belongs by comparing the values of the pattern layer. In certain configurations of the invention, the PNN may be modelled using the Python language to produce a graphical output.

In accordance with further aspects of an embodiment, textual data mining may begin with identifying a document that comes into the subject computer network through, by way of non-limiting example, an email attachment, a thumb drive, a file that is downloaded by an end user, or other similar electronic means. A bag-of-words approach may be engaged to allow for the possibility that tens of thousands of different words occur within a set of documents. The elimination of stop words or filler words is preferably employed to reduce common words within the text document. Additionally, an algorithm for stemming is used to identify and reduce the amount of words that have the same root word, but that may have variants based on the prefixes or suffixes that the root word may carry.

The training set of data in a PNN should consist of typical samples and patterns and should be sufficiently representative so that the hyperspace of the problem is well-covered, especially near decision surfaces. In an exemplary configuration of the invention, the datasets used were obtained from the publicly available University of California Irvine (UCI) database, which provides over 452 datasets. The datasets employed in exemplary configurations of the invention comprised the IRIS and Balance Scale datasets, particularly given their inclusion in each case of three classes that would align with methods employing at least certain aspects of the invention.

Systems and methods configured in accordance with at least certain aspects of the invention may evaluate a textual document using the PNN to classify the document as a threat or a possible threat. The purpose is thus to develop an effective method to predict the CVSS score that a test document would receive if evaluated by the CVEs stored in the NVD. Thus, a user can make an informed decision of whether or not to accept a document into an organizational or user network environment, and in certain configurations may have such informed decision and accepting or rejection of the subject document carried out automatically. In each case, a more updated and informed approach is provided for risk evaluation from the user's perspective. While resident antivirus software might not be fully up-to-date, methods employed in accordance with aspects of the invention allow for input from the user with a weighted metric and scoring process to accept, deny, or quarantine a given text document.

In accordance with certain aspects of an embodiment of the invention, an automated method is provided for monitoring and routing of electronic documents received at a computer network, comprising: receiving at a processor of a document cyber risk evaluation computer an electronic textual document; determining at the processor a frequency of occurrence of words in the electronic textual document; causing the processor to communicate with a database containing known cyber vulnerabilities associated with words, and identifying at the processor a collection of words in the electronic textual document that are present in the database; converting at the processor the collection of words into input vectors configured as input to a probabilistic neural network (PNN); causing at the processor the PNN to classify the electronic textual document, using the input vectors, as one of accept, quarantine, or deny; and routing the electronic document at the processor based on a classification of the input vectors to cause one of releasing the electronic textual document to a user computer on the computer network, storing the electronic textual document in memory for further analysis before releasing the electronic textual document to a user, and deleting the electronic textual document from the computer network.

In accordance with further aspects of an embodiment of the invention, a system is provided for monitoring and routing of electronic documents received at a computer network, comprising a memory and a processor in data communication with the memory, the memory having computer executable instructions stored thereon configured to be executed by the processor to cause the system to: receive an electronic textual document; determine a frequency of occurrence of words in the electronic textual document; communicate with a database containing known cyber vulnerabilities associated with words, and identify a collection of words in the electronic textual document that are present in the database; convert the collection of words into input vectors configured as input to a probabilistic neural network (PNN); cause the PNN to classify the electronic textual document, using the input vectors, as one of accept, quarantine, or deny; and route the electronic document based on a classification of the input vectors to cause one of releasing the electronic textual document to a user computer on the computer network, storing the electronic textual document in memory for further analysis before releasing the electronic textual document to a user, and deleting the electronic textual document from the computer network.

In accordance with still further aspects of an embodiment of the invention, a non-transitory computer-readable medium is provided having stored thereon one or more code sections each comprising a plurality of instructions executable by one or more processors, the instructions configured to cause the one or more processors to perform the actions of an automated method for monitoring and routing of electronic documents received at a computer network, the actions of the method comprising the steps of: receiving an electronic textual document; determining a frequency of occurrence of words in the electronic textual document; communicating with a database containing known cyber vulnerabilities associated with words, and identifying a collection of words in the electronic textual document that are present in the database; converting the collection of words into input vectors configured as input to a probabilistic neural network (PNN); causing the PNN to classify the electronic textual document, using the input vectors, as one of accept, quarantine, or deny; and routing the electronic document based on a classification of the input vectors to cause one of releasing the electronic textual document to a user computer on the computer network, storing the electronic textual document in memory for further analysis before releasing the electronic textual document to a user, and deleting the electronic textual document from the computer network.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The numerous advantages of the present invention may be better understood by those skilled in the art by reference to the accompanying drawings in which.

DETAILED DESCRIPTION

The invention summarized above may be better understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced items.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

By way of summary, systems and methods configured in accordance with certain aspects of the invention provide automated tools for evaluating the risk of a cyber threat posed by a textual document that is traversing a network, such as a PDF attachment to an email, and in turn providing a routing decision based on the risk evaluation such that the document may be released to the user if the calculated risk is sufficiently low, deleted if the calculated risk is sufficiently high, and quarantined for further evaluation if the risk is at a level that makes it prudent to not yet release the document but likewise raises sufficient question so as to not immediately delete the document. At times, antivirus software on a computer network has not been updated and/or the organization has identified a vulnerability that has not made it to the NVD or posted as a CVE, which is part of the calculation in CVSS metrics. Additionally, there may be a time lag between the identification of a vulnerability and when an organization is notified of that defect. These time gaps reflect the escalation of risk to an organizational network if a vulnerability is not identified for remediation in time. Essentially, the larger the time gap to identify the vulnerability, the higher the possible risk to the organizational network. Additionally, there is a possible increase in cost associated with the increase in organizational risk. Therefore, systems and methods configured in accordance with aspects of the invention set forth herein provide tools that may be applied from the lowest level of network user to evaluate textual documents using a PNN to classify the document as a threat, a possible threat, or a non-threat, and preferably to route the document in response to such classification (e.g., delete the document, route to quarantine, or release to the user).

Methods employed in accordance with aspects of an embodiment are based on text mining processes and classification of textual documents using a PNN classifier. Such methods are flexible as they may be open to modification by an organization if a CVE is identified within the organization before it can be placed in the NVD for public information. The organization can adjust the parameters of such methods based on the organization's risk tolerance or what level of risk the organization is willing to accept.

In a particularly exemplary configuration generated to test the methods set forth herein, data was gathered from the publicly available UCI database of text documents that needed to be parsed and formatted in a file that could be readable by a Python script. Of course, other publicly available databases of text documents could similarly be employed. In the exemplary embodiment described here, Portable Document Format ("PDF") documents are used as the exemplary text document due to the security issues commonly associated with PDF files. However, the systems and methods described herein may similarly be applied to other text document formats without departing from the spirit and scope of the invention. More particularly, PDF documents are open to privacy related issues, such that it is possible to retrieve any text or object previously deleted or modified and extract user information. Additionally, PDF documents are susceptible to push button malware attacks. PDF documents are also known as the industry standard for portable file exchange formats implemented by many free and commercially available programs. This universal exchange format opens a large attack surface for PDF users with the use of JavaScript objects within the Adobe Reader software package that is necessary to read PDF documents. From a practical sense, the pervasive nature of PDF documents make it essentially impossible for businesses to be able to afford to block all PDF attachments and downloads.

Figure 1:
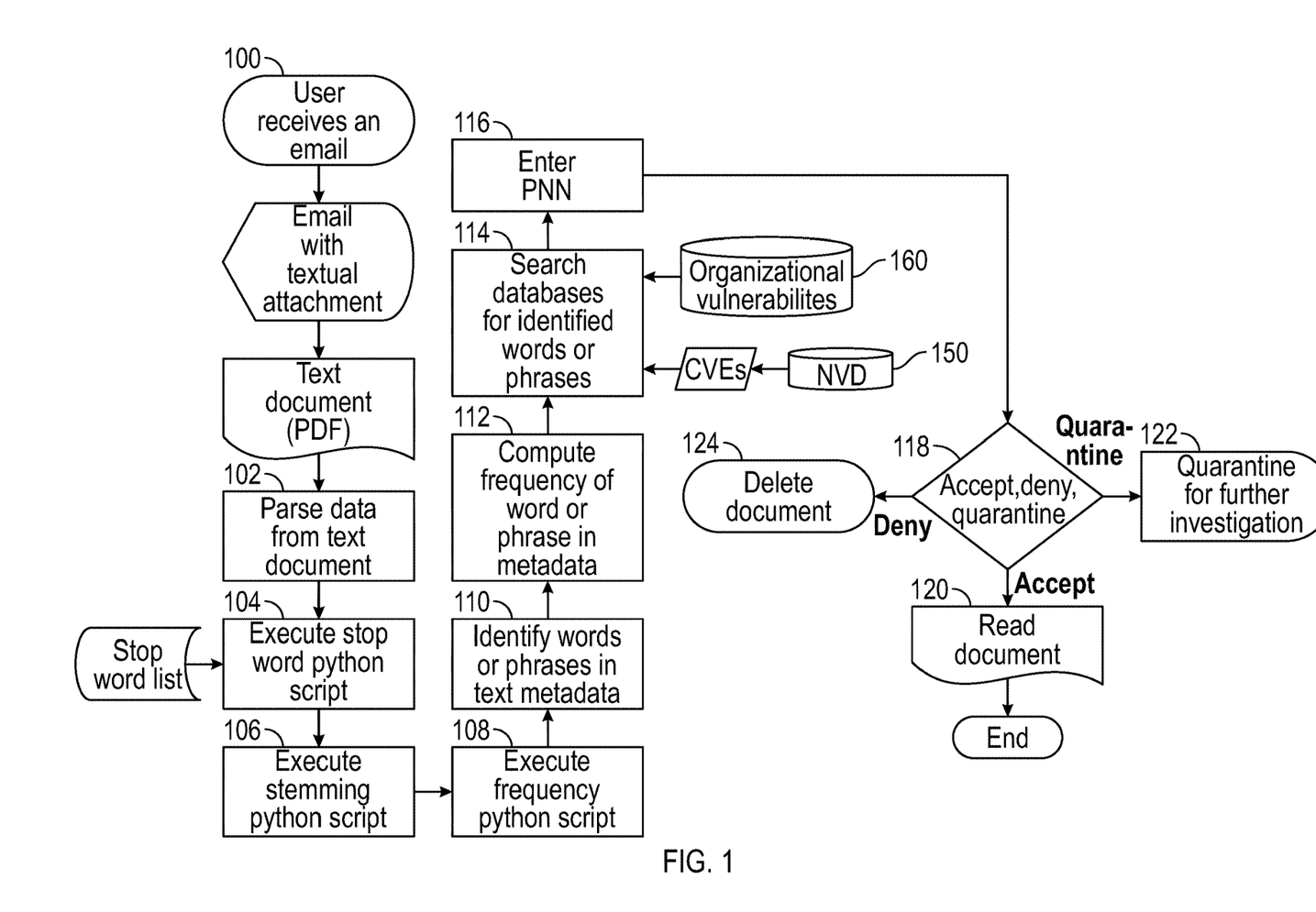
FIG. 1 provides a schematic diagram of a method for the automated calculation of cyber risk posed by a textual document traversing a network and using PNN in accordance with certain aspects of an embodiment of the invention.

FIG. 1 provides a schematic diagram of a method for the automated calculation of cyber risk posed by a textual document traversing a network and using PNN in accordance with certain aspects of an embodiment of the invention. At step 100, an electronic transmission (e.g., an email) is received at a computer network, such as an email intended for a user on such computer network, which email includes a textual document as an attachment. In the exemplary configuration discussed herein, such textual document comprises a PDF, although those skilled in the art will recognize that the systems and methods discussed herein are equally applicable to electronic documents of other formats that contain text, such as MICROSOFT WORD files or other word processing documents, MICROSOFT POWERPOINT slides or other electronic slide presentations, and such other electronic textual documents as may occur to those of ordinary skill in the art, whether now existing or provided in the future. At step 102, data is parsed from the text document. More particularly, the PDF file is analyzed by a document classification module (described further below), and metadata associated with the PDF file is read using, by way of non-limiting example, a Python package (PyPDF2) for extracting information from PDF documents. This tool focuses on analyzing text data and has a PDF parser that is an integral part of this process and creates a text file containing the text of the PDF file. At step 104, the document classification module executes a stop word function using, by way of non-limiting example, a Python Natural Language Toolkit (NLTK) stop word module which contains a stop word list (such as the words "the," "of," "and," and "to"). Following the elimination of the stop words, at step 106 the document classification module executes a word stemming function using, by way of non-limiting example, a Python word stemming script, which conducts a stemming operation to identify the stems of the words in the text file. Stemming is a process in which the variant word forms are shortened to their base forms. Generally, three types of stemmers may be employed, including rule-based, statistical, and hybrid. In the exemplary configuration described here, a rule-based stemmer was employed that removes the suffix and/or the prefix from the variant word forms.

Once the data has been thinned to a usable level from the previously described processes, a frequency formula is applied to assign the frequency at which a given word appears in the text document:

$$F = \frac{\text{number of words after thinning in text document}}{\text{number of times } CVE \text{ associated word occurs}}$$

Such words that are associated with a CVE may be present in either the metadata or the text associated with the body of the text document. Thus, at step 108, the document classification module executes a frequency Python script employing the above formula. At step 110, words or phrases in the text and metadata of the text document are identified, and at step 112, the foregoing formula is applied to determine the frequency of words or phrases in that text and metadata. At step 114, external and publicly accessible vulnerability databases 150 and/or internal vulnerability databases 160 may be searched by the document classification module to determine which of the words identified in the text document are present in such vulnerability databases 150 and 160.

Figure 1A:
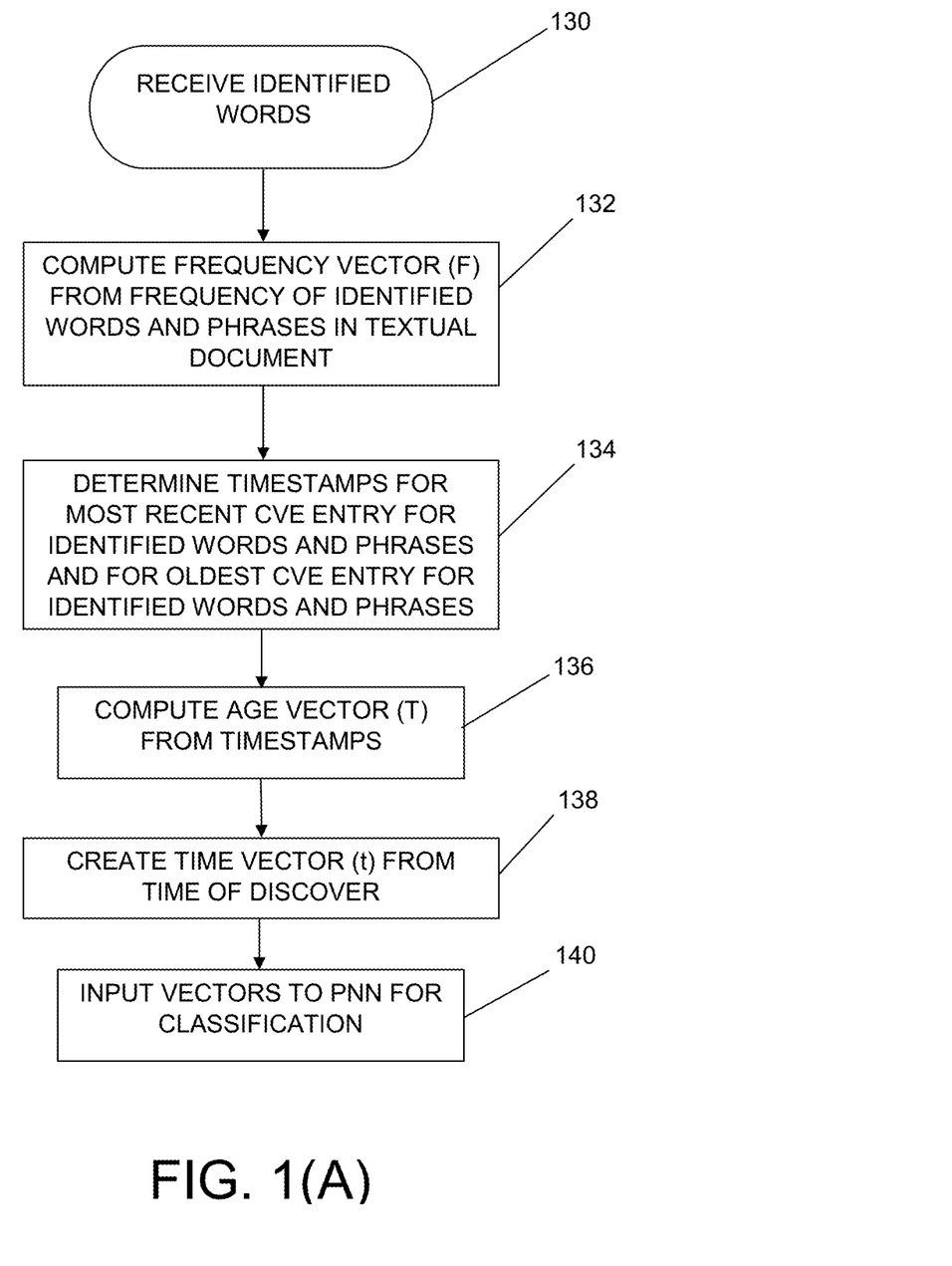
FIG. 1(A) provides a schematic diagram of a method for generating feature vectors as input to a PNN for use in the method depicted in FIG. 1.

The frequency of the identified words may then be processed by the document classification module to turn them into vectors and ready for class comparison using another Python script at step 116. That script reads the word list of the most frequent words, turning them into vectors and assigning class numbers. As shown in FIG. 1(A) and discussed in greater detail below, the vectors are then sorted into the K sets, where each set contains one class of feature vectors (Frequency, Time CVE is in the NVD (i.e., age of the CVE), and Time of discovery of the vulnerability). Then the document classification module may define the PNN into which those vectors are fed and classified.

It has been observed that the probability of a vulnerability being exploited approaches 90% between 40-60 days after discovery. Thus, the remediation gap, or time that the vulnerability is most likely to be exploited before it is closed, is nearly 60 days.

In the exemplary configuration described here, three classes are used (K=3). The input layer contains the 3 features (nodes) noted above for the PNN. Therefore, the features for the determination of the classes of acceptance, quarantine, and denial align to:

1. The frequency (F) of the word in the document;
2. The time (T) the CVE is in the NVD (i.e., the age of the CVE); and
3. The time (t) of discovery of the vulnerability.

Those features may be determined as follows;

As mentioned above, FIG. 1(A) shows the process of vector formation that is implemented by the document classification module for purposes of enabling the PNN to classify a particular textual document. First, at step 130, the document classification module receives the identified words (i.e., those words from the textual document that were identified as existing in the vulnerability databases 150 and/or 160) for processing into feature vectors for inputting into the PNN. Next, to obtain the frequency vector (F) at step 132, standard text mining steps using Python are employed as described above to identify and read the contents and metadata from the text files and to compute the frequency of the identified words and phrases using the formula noted above.

Next, to obtain the age vector (T), as mentioned above the document classification module first searches the CVE database (i.e., external vulnerability database 150 and/or internal vulnerability database 160) for the identified word or phrase, and a Python function is executed by the document classification module to determine if the word or phrase is identified or described in the CVE database as a threat. During the process of establishing the feature vectors, at step 134 the timestamp for the most recent CVE entry for such words or phrases that are identified as a threat are determined, and the timestamp for the oldest CVE entry for such words or phrases that are identified as a threat are determined, and at step 136 the age vector (T) is computed from those timestamps. A CVSS score may be attached to the CVE entry. Optionally, in the case that a known threat word or phrase is identified by a user that does not have a CVE record in the CVE database, such known threat word or phrase may at that time be entered into the CVE database.

Next, to obtain the time vector (t) at step 138 (the timestamp of the document or organizational discovery of the vulnerability), either a user may enter the time of discovery, or the timestamp of the text document may be read in from metadata associated with the text document. Thereafter, the frequency vector (F), age vector (T), and time vector (t) may be input at step 140 to the PNN for classification of the textual document which those vectors describe.

In an experimental implementation of the system and methods described herein, a reliable dataset containing at least 3 features and 3 classes or categories of classifications was necessary. As noted above, the organization may set the parameters for F, T, and t to implement the particularly desired security protocols for the organization, thus enabling the organization to tighten or loosen the basis for the classification of the PNN from time to time based on changing risk profiles resulting, by way of non-limiting example, from company growth or putting additional cyber security systems and/or procedures in place.

Thus, in one such experimental implementation the publicly available IRIS dataset was selected, which contains 4 features and 3 classifications. This meant that a feature selection method had to be used to select the best 3 of the 4 features. By using a k-nearest neighbor (KNN) method and a Sequential Forward Selection, the best 3 features were selected for k=3, as follows:

Sequential Forward Selection (k=3):
(1, 2, 3) CV Score: 0.972756410256
(accuracy to which the KNN has selected the best 3 features within the IRIS dataset). The IRIS dataset in this experimental implementation was used to demonstrate the use of the textual mining an PNN approach. This dataset is perhaps the best-known database to be found in the pattern recognition literature. The data set contains 3 classes of 50 instances each, where each class refers to a type of IRIS plant. One class is linearly separable from the other 2; the latter are not linearly separable from each other.

Figure 2:
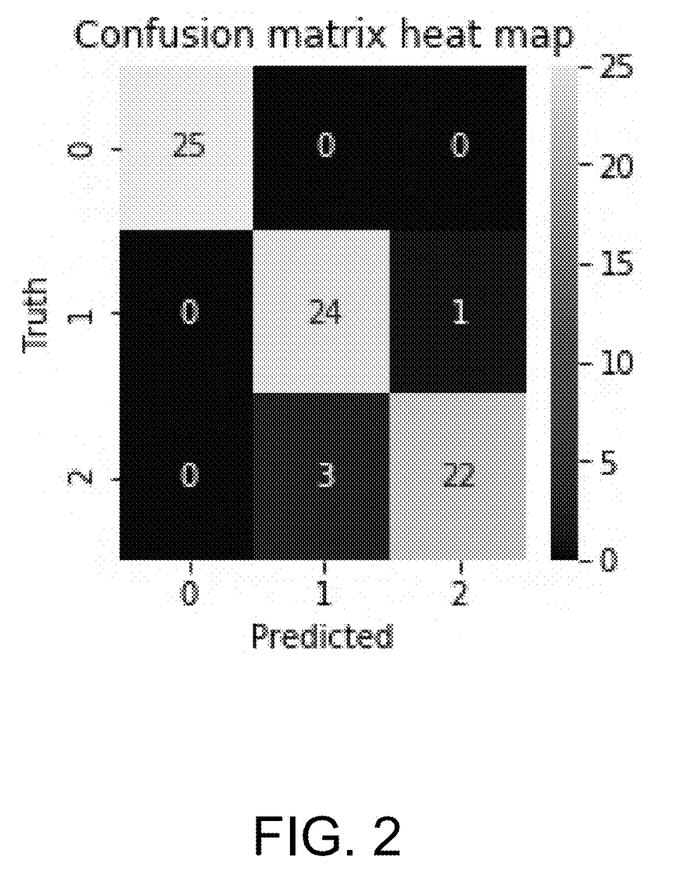
FIG. 2 is a graphical representation of a confusion matrix heat map of evaluated text documents produced using the method of FIG. 1.

The foregoing methods were applied to train the IRIS dataset, after which test data of 75 points were similarly evaluated. Applying those methods to that test data produced the classifications shown in the confusion matrix heat map of evaluated text documents of FIG. 2. The confusion matrix is defined by labelling the desired classification on the rows, and the predicted classifications on the columns. As the goal is to have the predicted classification be the same as the desired classification, the ideal situation is to have all the exemplars end up on the diagonal cells of the matrix (which would represent the ideal case of 100% accuracy). The results from the confusion matrix for the IRIS dataset show the following:

For class 0 (ACCEPT), all 25 records were correctly predicted to be in that class.

For class 1 (QUARANTINE), 24 were correctly predicted to be in that class, while 1 was falsely or incorrectly predicted to be acceptable (in class 0).

For class 2 (DENY), 22 were correctly predicted to be in that class, while 3 were falsely predicted to be eligible for quarantine.

Thus, at step 118 (FIG. 1), the document classification module may classify one or more text documents using the PNN described as either ACCEPT (in which case the document is released to the user to enable it to be read at step 120), QUARANTINE (in which case the document is routed or copied to a quarantine file location at step 122 for further analysis), or DENY (in which case the document is deleted from the computer network at step 124).

Figure 3:
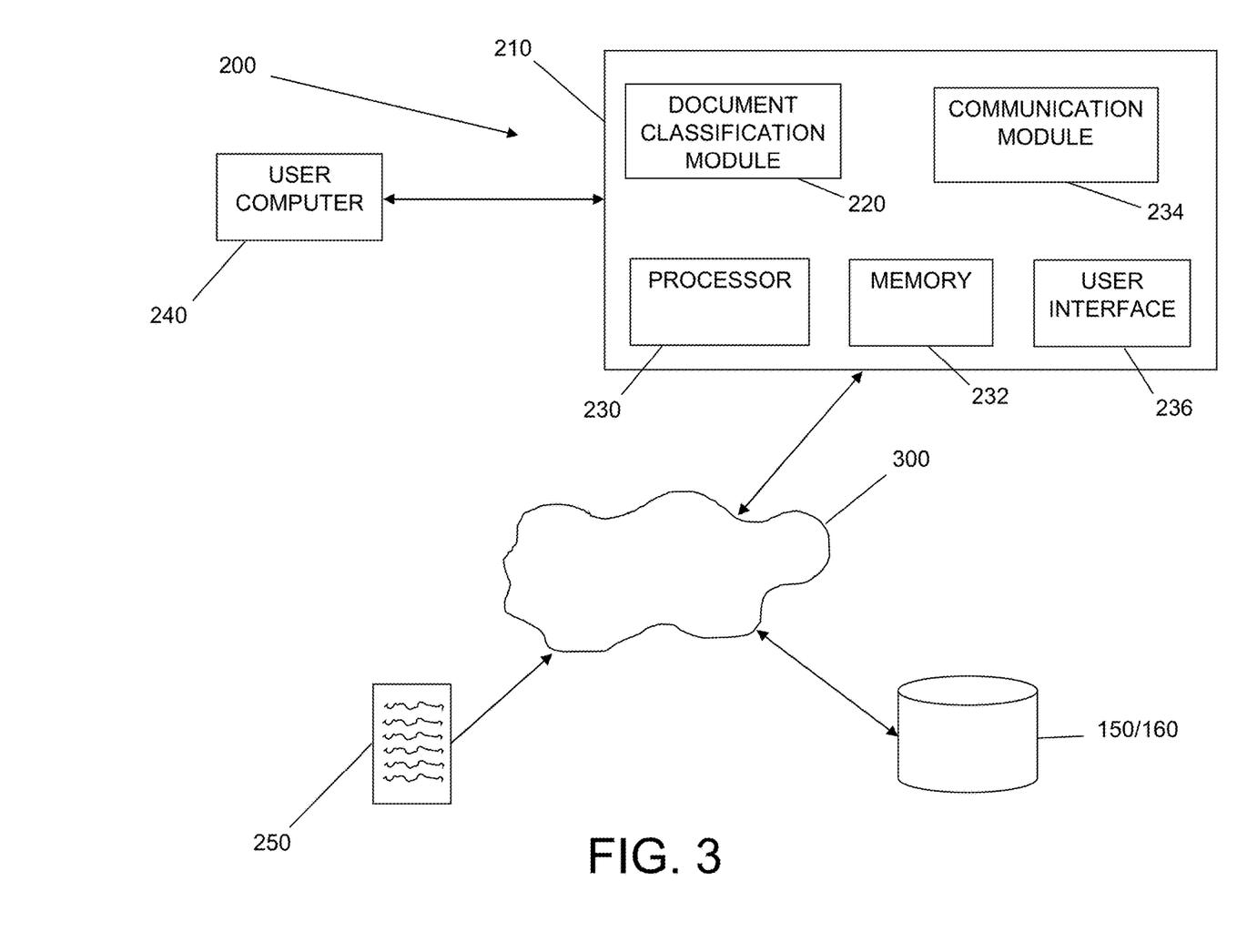
FIG. 3 is a schematic view of an exemplary system configured for implementing the methods of FIG. 1.

FIG. 3 is a schematic view of an exemplary system 200 configured for implementing the automated calculation of cyber risk posed by a textual document traversing a network and using PNN of FIG. 1. A document cyber risk evaluation engine 210 includes document classification module 220, which document classification module is principally responsible for carrying out the steps described above. Document cyber risk evaluation engine 210 also preferably includes a processor 230, memory 232, a communications module 234, and a user interface module 236. Cyber risk evaluation engine is preferably in data communication with a wide area network 300 such as the Internet. Communication messages 250, such as by way of non-limiting example email messages intended for an end user 240 of a computer network (such as the computer network of a single business or similarly situated entity), may be transmitted via wide area network 300 to document cyber risk evaluation engine 210, where communications module 234 intercepts the message for processing by document classifier 220 as described above. During such processing, and particularly when document classification module 220 carries out step 114 of searching vulnerability databases, document cyber risk evaluation engine 210 may be in data communication with vulnerability databases 150/160 through wide area network 300. Those skilled in the art will recognize that organizational vulnerabilities database 160 may likewise be stored on the same computer network of which document cyber risk evaluation engine 210 is a part. After carrying out the method described above with respect to FIG. 1, document classification module 220 may transmit a message to end user 240 via communications module 234 that either includes the original communication message with the attachment (which the classification at step 118 was ACCEPT), or may alternatively generate and transmit to the end user 240 a message indicating that a communication message 250 has been received with a text document attachment, but that such text document attachment has either been quarantined or deleted, depending upon the classification that was determined at step 118.

Figure 4:
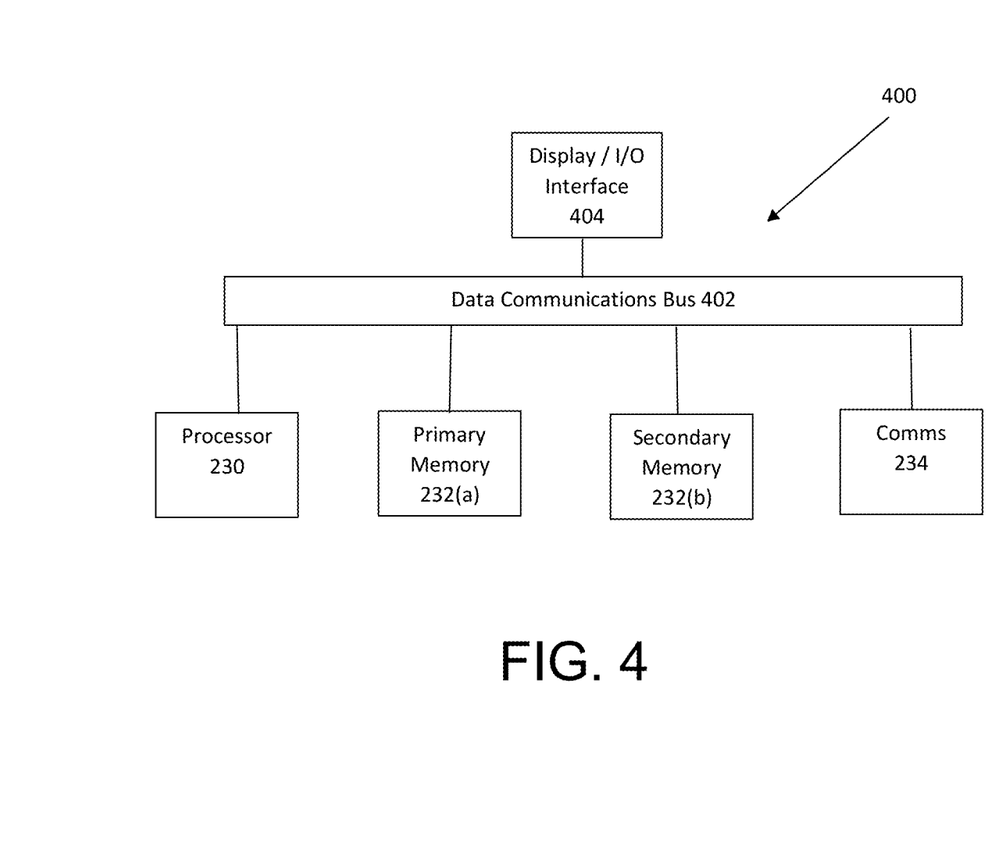
FIG. 4 is a schematic view of an exemplary computer system suitable for implementing the methods described herein.

Next, FIG. 4 shows an exemplary computer system architecture 400 suitable for implementing the methods described herein. Those skilled in the art will recognize that system 200 configured for the automated calculation of cyber risk posed by a textual document traversing a network and using PNN may take the form of computer system 400 as reflected schematically in FIG. 4, though variations thereof may readily be implemented by persons skilled in the art as may be desirable for any particular installation. In each such case, one or more computer systems 400 may carry out the foregoing methods as computer code.

Computer system 400 includes a communications bus 402, or other communications infrastructure, which communicates data to other elements of computer system 400. For example, communications bus 402 may communicate data (e.g., text, graphics, video, other data) between bus 402 and an I/O interface 404, which may include a display, a data entry device such as a keyboard, touch screen, mouse, or the like, and any other peripheral devices capable of entering and/or viewing data as may be apparent to those skilled in the art. Further, computer system 400 includes processor 230, which may comprise a special purpose or a general purpose digital signal processor. Still further, computer system 400 includes a primary memory 232(a), which may include by way of non-limiting example random access memory ("RAM"), read-only memory ("ROM"), one or more mass storage devices, or any combination of tangible, non-transitory memory. Still further, computer system 400 includes a secondary memory 232(b), which may comprise a hard disk, a removable data storage unit, or any combination of tangible, non-transitory memory. Finally, computer system 400 may include communications module 234, such as a modem, a network interface (e.g., an Ethernet card or cable), a communications port, a PCMCIA slot and card, a wired or wireless communications system (such as Wi-Fi, Bluetooth, Infrared, and the like), local area networks, wide area networks, intranets, and the like.

Each of primary memory 232(a), secondary memory 232(b), communications module 234, and combinations of the foregoing may function as a computer usable storage medium or computer readable storage medium to store and/or access computer software including computer instructions. For example, computer programs or other instructions may be loaded into the computer system 400 such as through a removable data storage device (e.g., a floppy disk, ZIP disks, magnetic tape, portable flash drive, optical disk such as a CD, DVD, or Blu-ray disk, Micro Electro Mechanical Systems ("MEMS"), and the like). Thus, computer software including computer instructions may be transferred from, e.g., a removable storage or hard disc to secondary memory 232(b), or through data communication bus 402 to primary memory 232(a).

Communication module 234 allows software, instructions and data to be transferred between the computer system 400 and external devices or external networks. Software, instructions, and/or data transferred by the communication module 234 are typically in the form of signals that may be electronic, electromagnetic, optical or other signals capable of being sent and received by communication module 234. Signals may be sent and received using a cable or wire, fiber optics, telephone line, cellular telephone connection, radio frequency ("RF") communication, wireless communication, or other communication channels as will occur to those of ordinary skill in the art.

Computer programs, when executed, allow the processor of computer system 400 to implement the methods discussed herein for the automated calculation of cyber risk posed by a textual document traversing a network and using PNN of FIG. 1, according to computer software including instructions.

Computer system 400 may perform any one of, or any combination of, the steps of any of the methods described herein. It is also contemplated that the methods according to the present invention may be performed automatically or may be accomplished by some form of manual intervention.

The computer system 400 of FIG. 4 is provided only for purposes of illustration, such that the invention is not limited to this specific embodiment. Persons having ordinary skill in the art are capable of programming and implementing the instant invention using any computer system.

Further, computer system 400 may, in certain implementations, comprise a handheld device and may include any small-sized computing device, including by way of non-limiting example a cellular telephone, a smartphone or other smart handheld computing device, a personal digital assistant, a laptop or notebook computer, a tablet computer, a hand-held console, an MP3 player, or other similarly configured small-size, portable computing device as may occur to those skilled in the art.

The system of FIG. 3 may, in an exemplary configuration, be implemented in a cloud computing environment for carrying out the methods described herein. That cloud computing environment uses the resources from various networks as a collective virtual computer, where the services and applications can run independently from a particular computer or server configuration making hardware less important. The cloud computer environment includes at least one user computing device. The client computer may be any device that may be used to access a distributed computing environment to perform the methods disclosed herein and may include (by way of non-limiting example) a desktop computer, a portable computer, a mobile phone, a personal digital assistant, a tablet computer, or any similarly configured computing device.

A client computer preferably includes memory such as RAM, ROM, one or more mass storage devices, or any combination of the foregoing. The memory functions as a computer readable storage medium to store and/or access computer software and/or instructions.

A client computer also preferably includes a communications interface, such as a modem, a network interface (e.g., an Ethernet card), a communications port, a PCMCIA slot and card, wired or wireless systems, and the like. The communications interface allows communication through transferred signals between the client computer and external devices including networks such as the Internet and a cloud data center. Communication may be implemented using wireless or wired capability, including (by way of non-limiting example) cable, fiber optics, telephone line, cellular telephone, radio waves or other communications channels as may occur to those skilled in the art.

Such client computer establishes communication with the one or more servers via, for example, the Internet, to in turn establish communication with one or more cloud data centers that implement system 200. A cloud data center may include one or more networks that are managed through a cloud management system. Each such network includes resource servers that permit access to a collection of computing resources and components of system 200, which computing resources and components can be invoked to instantiate a virtual computer, process, or other resource for a limited or defined duration. For example, one group of resource servers can host and serve an operating system or components thereof to deliver and instantiate a virtual computer. Another group of resource servers can accept requests to host computing cycles or processor time, to supply a defined level of processing power for a virtual computer. Another group of resource servers can host and serve applications to load on an instantiation of a virtual computer, such as an email client, a browser application, a messaging application, or other applications or software.

The cloud management system may comprise a dedicated or centralized server and/or other software, hardware, and network tools to communicate with one or more networks, such as the Internet or other public or private network, and their associated sets of resource servers. The cloud management system may be configured to query and identify the computing resources and components managed by the set of resource servers needed and available for use in the cloud data center. More particularly, the cloud management system may be configured to identify the hardware resources and components such as type and amount of processing power, type and amount of memory, type and amount of storage, type and amount of network bandwidth and the like, of the set of resource servers needed and available for use in the cloud data center. The cloud management system can also be configured to identify the software resources and components, such as type of operating system, application programs, etc., of the set of resource servers needed and available for use in the cloud data center.

In accordance with still further aspects of an embodiment of the invention, a computer program product may be provided to provide software to the cloud computing environment. Computer products store software on any computer useable medium, known now or in the future. Such software, when executed, may implement the methods according to certain embodiments of the invention. By way of non-limiting example, such computer usable mediums may include primary storage devices (e.g., any type of random access memory), secondary storage devices (e.g., hard drives, floppy disks, CD ROMS, ZIP disks, tapes, magnetic storage devices, optical storage devices, MEMS, nanotech storage devices, etc.), and communication mediums (e.g., wired and wireless communications networks, local area networks, wide area networks, intranets, etc.). Those skilled in the art will recognize that the embodiments described herein may be implemented using software, hardware, firmware, or combinations thereof. The cloud computing environment described above is provided only for purposes of illustration and does not limit the invention to this specific embodiment. It will be appreciated that those skilled in the art are readily able to program and implement the invention using any computer system or network architecture.

Systems and methods configured in accordance with the foregoing may enable an organization, or a user within an organization, to employ an informed risk decision about a potential cyber threat associated with a text document or possible set of text documents, which risk decision may then be used to automatically route the text document for either release to the intended recipient user, quarantine for further analysis, or deletion from the associated computer network. Using the elements of textual data mining and a vulnerability database, an accurate classification may be determined using a PNN coded, for example, in Python. The use of the automated calculation of risk for a text document using PNN methods as described herein provide an organization, a system administrator, and/or a system user with the ability to classify vulnerabilities, allowing for dynamic risk tolerance levels. Feature selection as described herein offers more control and flexibility over whether to accept a text document. Methods employed in accordance with the foregoing description may also increase decision making speed for acceptance of a text document at a computer network.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. An automated method for monitoring and routing of electronic documents received at a computer network, comprising:
   receiving at a processor of a document cyber risk evaluation computer an electronic textual document;
   determining at said processor a frequency of occurrence for each of a plurality of words in said electronic textual document;
   causing said processor to communicate with a database containing known cyber vulnerabilities and exposures associated words, and identifying at said processor a collection of said plurality of words in said electronic textual document that are present in said database;
   converting at said processor said collection of said plurality of words in said electronic textual document into input vectors configured as input to a probabilistic neural network (PNN);
   causing at said processor said PNN to classify said electronic textual document, using said input vectors, as one of accept, quarantine, or deny; and
   routing said electronic textual document at said processor based on a classification of said input vectors to cause one of releasing said electronic textual document to a user computer on said computer network, storing said electronic textual document in memory for further analysis before releasing said electronic textual document to a user, and deleting said electronic textual document from said computer network.

2. The automated method for monitoring and routing of electronic documents received at a computer network of claim 1, wherein said electronic textual document further comprises a textual document file attached to a communication message.

3. The automated method for monitoring and routing of electronic documents received at a computer network of claim 2, wherein said electronic textual document further comprises a PDF file attached to an email message received at said computer network.

4. The automated method for monitoring and routing of electronic documents received at a computer network of claim 1, further comprising the step of:
   removing at said processor a list of stop words from said electronic textual document prior to identifying said collection of words, wherein said stop words comprise at least "the," "of," "and," and "to".

5. The automated method for monitoring and routing of electronic documents received at a computer network of claim 1, further comprising the step of:

converting at said processor a plurality of said plurality of words in said electronic textual document to one or more word stems prior to identifying said collection of words.

6. The automated method for monitoring and routing of electronic documents received at a computer network of claim 1, wherein said step of determining the frequency of occurrence for each of the plurality of words in said electronic textual document further comprises determining the frequency of occurrence for each of the plurality of words in each or both of: (i) a body of said electronic textual document, and (ii) in metadata associated with said electronic textual document.

7. The automated method for monitoring and routing of electronic documents received at a computer network of claim 1, wherein said database containing known cyber vulnerabilities and exposures associated words further comprises a remote, publicly accessible database.

8. The automated method for monitoring and routing of electronic documents received at a computer network of claim 1, wherein said input vectors further comprise features, said features further comprising (i) frequency of an identified word in said electronic textual document, (ii) a time that said identified word has been present in said database, and (iii) a time of discovery of a vulnerability associated with said identified word.

9. A system for monitoring and routing of electronic documents received at a computer network, comprising a memory and a processor in data communication with said memory, the memory having computer executable instructions stored thereon configured to be executed by the processor to cause the system to:
receive an electronic textual document;
determine a frequency of occurrence for each of a plurality of words in said electronic textual document;
communicate with a database containing known cyber vulnerabilities and exposures associated words, and identify a collection of said plurality of words in said electronic textual document that are present in said database;
convert said collection of said plurality of words in said electronic textual document into input vectors configured as input to a probabilistic neural network (PNN);
cause said PNN to classify said electronic textual document, using said input vectors, as one of accept, quarantine, or deny; and
route said electronic textual document based on a classification of said input vectors to cause one of releasing said electronic textual document to a user computer on said computer network, storing said electronic textual document in memory for further analysis before releasing said electronic textual document to a user, and deleting said electronic textual document from said computer network.

10. The system for monitoring and routing of electronic documents received at a computer network of claim 9, wherein said electronic textual document further comprises a textual document file attached to a communication message.

11. The system for monitoring and routing of electronic documents received at a computer network of claim 10, wherein said electronic textual document further comprises a PDF file attached to an email message received at said computer network.

12. The system for monitoring and routing of electronic documents received at a computer network of claim 9, wherein said computer executable instructions stored thereon are further configured to be executed by the processor to cause the system to:
remove a list of stop words from said electronic textual document prior to identifying said collection of words, wherein said stop words comprise at least "the," "of," "and," and "to".

13. The system for monitoring and routing of electronic documents received at a computer network of claim 9, wherein said computer executable instructions stored thereon are further configured to be executed by the processor to cause the system to:
convert a plurality of said plurality of words in said electronic textual document to one or more word stems prior to identifying said collection of words.

14. The system for monitoring and routing of electronic documents received at a computer network of claim 9, wherein said computer executable instruction configured to be executed by the processor to cause the system to determine the frequency of occurrence for each of the plurality of words in said electronic textual document is further configured to be executed by the processor to cause the system to determine the frequency of occurrence for each of the plurality of words in each or both of: (i) a body of said electronic textual document, and (ii) in metadata associated with said electronic textual document.

15. The system for monitoring and routing of electronic documents received at a computer network of claim 9, wherein said database containing known cyber vulnerabilities and exposures associated words further comprises a remote, publicly accessible database.

16. The system for monitoring and routing of electronic documents received at a computer network of claim 9, wherein said input vectors further comprise features, said features further comprising (i) frequency of an identified word in said electronic textual document, (ii) a time that said identified word has been present in said database, and (iii) a time of discovery of a vulnerability associated with said identified word.

17. A non-transitory computer-readable medium having stored thereon a plurality of instructions executable by one or more processors, the instructions configured to cause the one or more processors to perform the actions of an automated method for monitoring and routing of electronic documents received at a computer network, the actions of the method comprising the steps of:
receiving an electronic textual document;
determining a frequency of occurrence for each of a plurality of words in said electronic textual document;
communicating with a database containing known cyber vulnerabilities and exposures associated words, and identifying a collection of said plurality of words in said electronic textual document that are present in said database;
converting said collection of said plurality of words into input vectors configured as input to a probabilistic neural network (PNN);
causing said PNN to classify said electronic textual document, using said input vectors, as one of accept, quarantine, or deny; and
routing said electronic textual document based on a classification of said input vectors to cause one of releasing said electronic textual document to a user computer on said computer network, storing said electronic textual document in memory for further analysis before releasing said electronic textual document to a user, and deleting said electronic textual document from said computer network.

18. The non-transitory computer-readable medium of claim 17, wherein said electronic textual document further comprises a textual document file attached to a communication message.

19. The non-transitory computer-readable medium of claim 18, wherein said electronic textual document further comprises a PDF file attached to an email message received at said computer network.

20. The non-transitory computer-readable medium of claim 17, wherein said input vectors further comprise features, said features further comprising (i) frequency of an identified word in said electronic textual document, (ii) a time that said identified word has been present in said database, and (iii) a time of discovery of a vulnerability associated with said identified word.

\* \* \* \* \*